United States Patent
Van Houtum et al.

(10) Patent No.: US 6,765,628 B1
(45) Date of Patent: Jul. 20, 2004

(54) METHOD AND APPARATUS FOR SEARCHING CHANNELS

(75) Inventors: Wilhelmus J. Van Houtum, Eindhoven (NL); Peter J. H. Rutten, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/601,855

(22) PCT Filed: Dec. 13, 1999

(86) PCT No.: PCT/EP99/09825
§ 371 (c)(1),
(2), (4) Date: Aug. 9, 2000

(87) PCT Pub. No.: WO00/36829
PCT Pub. Date: Jun. 22, 2000

(30) Foreign Application Priority Data

Dec. 15, 1998 (EP) .............................................. 98204265

(51) Int. Cl.⁷ .............................. H04N 5/50; H04N 5/44
(52) U.S. Cl. ........................ 348/732; 348/731; 348/729; 725/38; 455/3.02; 455/77; 455/464; 455/185.1
(58) Field of Search ................................ 348/731, 732, 348/725, 726, 729, 723; 725/38, 48, 68, 63; 455/150.1, 154.1, 179.1, 180.1, 185.1, 186.1, 188.1, 464, 77, 3.02; 701/13; 342/352, 355, 356, 358, 357.06, 357.12

(56) References Cited

U.S. PATENT DOCUMENTS

| | | | | |
|---|---|---|---|---|
| 5,635,996 A | * | 6/1997 | Okamura | 348/732 |
| 5,754,257 A | * | 5/1998 | Lee | 348/731 |
| 5,864,358 A | * | 1/1999 | Suzuki et al. | 725/142 |
| 5,886,691 A | * | 3/1999 | Furuya et al. | 345/721 |
| 5,898,695 A | * | 4/1999 | Fujii et al. | 370/464 |
| 6,133,910 A | * | 10/2000 | Stinebruner | 725/49 |
| 6,137,546 A | * | 10/2000 | Shintani et al. | 348/731 |
| 6,198,513 B1 | * | 3/2001 | Cherrick | 348/731 |
| 6,252,634 B1 | * | 6/2001 | Yuen et al. | 348/731 |
| 6,411,335 B1 | * | 6/2002 | Jang | 348/553 |
| 6,456,338 B1 | * | 9/2002 | Yuen | 348/731 |

FOREIGN PATENT DOCUMENTS

| | | | | |
|---|---|---|---|---|
| EP | 0821523 A3 | 1/1998 | | H04N/5/44 |
| EP | 0821523 A2 | 1/1998 | | H04N/5/44 |

* cited by examiner

Primary Examiner—Michael H. Lee
Assistant Examiner—Jean W. Désir
(74) Attorney, Agent, or Firm—Michael J. Ure

(57) ABSTRACT

A method for searching a predetermined satellite channel by making use of information available from the satellite.

The method comprises three steps. The first step is searching for a service channel from the satellite, if found than the user look up table is updated with this information. A second step is updating the user look up table by using the receiver look up table, which is implemented in the satellite receiver. The third step is the conventionally search through the entire band till the predetermined channel is found.

2 Claims, 2 Drawing Sheets

METHOD AND APPARATUS FOR SEARCHING CHANNELS

The invention relates to a method for searching channels and to a satellite receiver.

EP-A-0821523 describes a method in a digital television signal receiver whereby a service table is composed of channel numbers currently on air.

To give the user the impression that a quick search through the whole frequency band is performed, only the channel number is increased (decreased) by continuously pressing the +(−) button, and only when the +/− button is released the actual channel frequency of the chosen channel is used to obtain the chosen video/audio information.

A disadvantage of the known method and receiver is that to obtain a certain channel still the same considerably amount of time in needed, only the impression of a quicker search is obtained.

It is, inter alia, an object of the invention to provide a method and a receiver that overcomes the drawbacks of the prior art.

To this end a first aspect of the invention provides a method as defined in claim 1.

A second aspect of the invention provides a receiver as defined in claim 2.

By using information of existing transmission systems from a service channel stored in a user look-up table the search time is considerably reduced (the first step of the method). Further by using the second step of the method a receiver look up table is used to update the user look up table. The search through the relevant band has to be performed only with a subset of transmission parameters as where known at the moment the receiver was made. For example the receiver look up table can be stored in a chip. It is also possible to deliver updated chips when the information of the different satellites changes after some time. The last (third) step of the method comprises the present state of the art method to search channels.

An embodiment of a receiver according to the invention comprises the features of claim 3.

By using the method of searching the receiver will much more faster find the required satellite channel(s).

Figure 1:
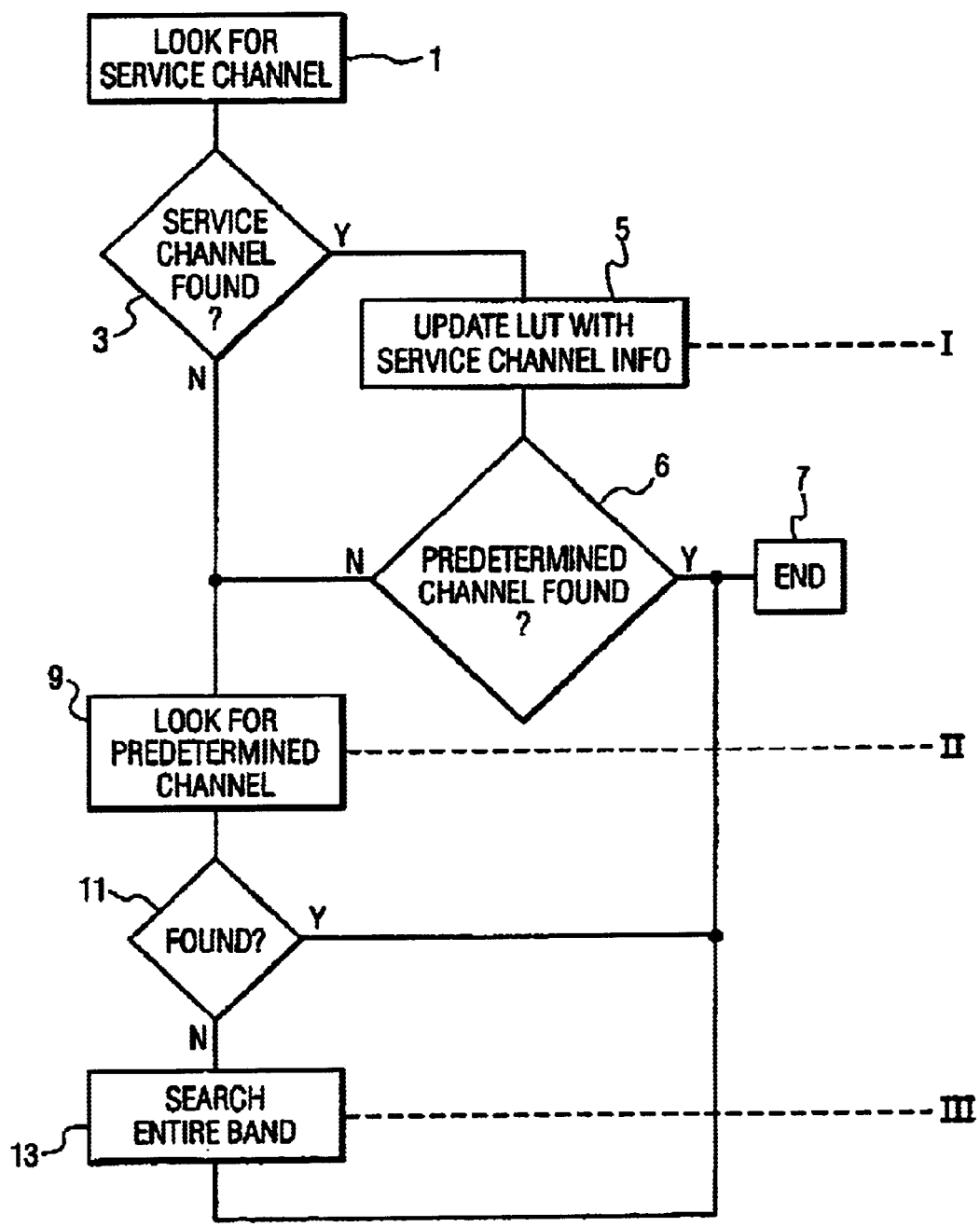

The invention and additional features, which may optionally be used to advantage, will be apparent from and elucidated with reference to the examples described below hereinafter and shown in the figures. Herein shows:

FIG. 1 a flow chart of an example of the method according to the invention, and

Figure 2:
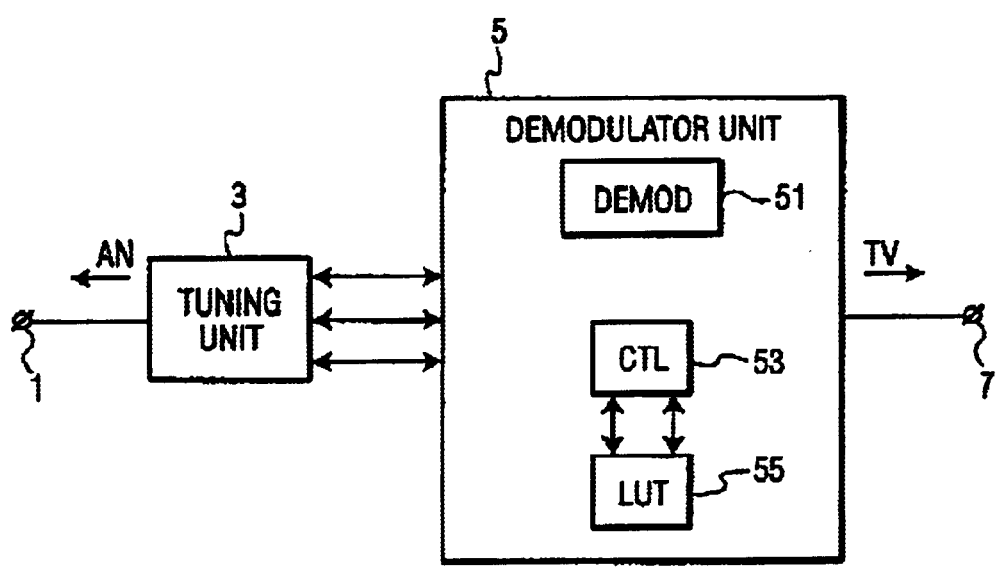

FIG. 2 a schematic example of a receiver according to the invention.

FIG. 1 is shows a flow chart of an example of a method according to the invention, wherein in block I the search for a predetermined satellite channel is started. The method has three steps with increasing time consumption. A first step (I): in block 3 the decision is made whether or not a service channel is found. If found (Y) a user look up table is updated with the service channel information (block 5). The service channel can contain specific information i.e. carrier frequency, polarization, orbital position, symbol rate and code rate of all channels transmitted by that satellite (i.e. ASTRA). If the predetermined channel is found (Y) the search can be ended (Block 7). If not the search is continued with a second step (II): in a receiver look up table in the satellite receiver, the predetermined channel is looked for (block 9). The receiver look up table contains all information about transmission parameters of the different satellites, which were available at the moment, the receiver was made. This information can contain channel information i.e. carrier frequency, polarization, orbital position, symbol rate and code rate of all channels transmitted by each available satellite (i.e. ASTRA, eutelsat, etc.). This receiver look up table can be stored in a chip in the receiver. It is for example also possible to supply a new chip when the information about the different satellites has been changed after some time. In block 11 the decision is made whether or not the predetermined channel is found. IF found (Y) the search can be ended (block 7). If not a search through the entire band has to be performed by a third step (III) (block 13). After the predetermined channel has been found the search can be ended (block 7).

FIG. 2 shows a schematic example of a satellite receiver SR according to the invention, wherein the satellite receiver comprises an input 1 for receiving RF signals from an (not shown) satellite antenna AN. The input is coupled to a tuning unit 3 for supplying the received channels. The satellite receiver further comprises a demodulator unit 5 with demodulation means 51 for demodulation of the satellite channels. The demodulation unit further comprises control means 53 and storing means 55 for storing the user look up table and the receiver look up table. Further the algorithm of the method is stored for example in a RAM.

Under control of the control means the method of the invention is performed in the satellite receiver SR.

The receiver look up table can be implemented in a chip (not shown). Which chip can be replaced if the information about the satellites has been changed. At the output 7 the satellite receiver SR supplies the satellite channels to a (not shown) television receiver TV.

It is to be noticed that above the method and the satellite receiver according to the invention has been described on the basis of an example. The man skilled in the art will be well aware of a lot of variations, which fall within the scope of the present invention.

What is claimed is:

1. A method of determining tuning information corresponding to a channel number, comprising:

searching for a service channel;
if a service channel is found, determining whether or not tuning information for the channel number can be obtained from the service channel;
if tuning information for the channel number can be obtained from the service channel, obtaining the tuning information;
if the tuning information cannot be obtained from a service channel, accessing a local lookup table, if present;
if tuning information for the channel number can be obtained from the local lookup table, obtaining the tuning information; and
if the tuning information cannot be obtained from a local lookup table, scanning a frequency band to determine the tuning information.

2. A communications receiver comprising:

a tuner; and a controller, wherein the controller determines tuning information corresponding to a channel number by:

searching for a service channel;

if a service channel is found, determining whether or not tuning information for the channel number can be obtained from the service channel;

if tuning information for the channel number can be obtained from the service channel, obtaining the tuning information;

if the tuning information cannot be obtained from a service channel, accessing a local lookup table, if present;

if tuning information for the channel number can be obtained from the local lookup table, obtaining the tuning information; and if the tuning information cannot be obtained from a local lookup table, scanning a frequency band to determine the tuning information.

* * * * *